United States Patent
Rabenold et al.

(10) Patent No.: US 7,028,885 B2
(45) Date of Patent: Apr. 18, 2006

(54) AUTOMATED CONDITION EVALUATOR

(75) Inventors: Nancy J. Rabenold, Brandon, FL (US); James A. Simmons, Brandon, FL (US)

(73) Assignee: Auction Management Solutions, INC, Tampa, FL (US)

( * ) Notice: Subject to any disclaimer, the term of this patent is extended or adjusted under 35 U.S.C. 154(b) by 0 days.

(21) Appl. No.: 10/812,219

(22) Filed: Mar. 29, 2004

(65) Prior Publication Data

US 2004/0188513 A1    Sep. 30, 2004

Related U.S. Application Data

(60) Provisional application No. 60/458,713, filed on Mar. 28, 2003.

(51) Int. Cl.
*G06F 17/00* (2006.01)

(52) U.S. Cl. ...................................... 235/375; 235/378

(58) Field of Classification Search ................ 235/375, 235/376, 385, 435, 438; 702/130; 340/615
See application file for complete search history.

(56) References Cited

U.S. PATENT DOCUMENTS

| | | | | |
|---|---|---|---|---|
| 5,494,136 A | * | 2/1996 | Humble | 186/61 |
| 5,497,314 A | * | 3/1996 | Novak | 705/17 |
| 5,525,786 A | * | 6/1996 | Dumont | 235/462.14 |
| 6,411,916 B1 | * | 6/2002 | Pellerin | 702/130 |
| 6,592,033 B1 | * | 7/2003 | Jennings et al. | 235/385 |
| 6,755,243 B1 | * | 6/2004 | Cho et al. | 165/289 |
| 2002/0138374 A1 | * | 9/2002 | Jennings et al. | 705/29 |

* cited by examiner

*Primary Examiner*—Steven S. Paik
(74) *Attorney, Agent, or Firm*—Smith Frohwein Tempel Greenlee Blaha, LLC; Gregory Scott Smith

(57) ABSTRACT

Disclosed is an automated condition evaluator that conducts an evaluation of an item placed into a sensor chamber to identify the item and determine characteristics about that item that can assist a party in making a decision about the item. More specifically, an item is placed into a sensor chamber and various sensors are actuated in an effort to identify the item. Extrinsic information may also be introduced into the identification process. Once the item is identified, a rigorous evaluation of the item is conducted to determine any flaws, characteristics, or changes from the standard are present in the item. The sensors evaluate the item in 3 dimensional space and the results are compared against expected results. Any variations are classified for evaluation. When the item being evaluated is a vehicle, the classifications of the differences include scratches, dents, holes and other problems that are characteristic of vehicle flaws.

1 Claim, 7 Drawing Sheets

Scenario #1 - Automotive Item Description

| | |
|---|---|
| SELECT ITEM CATEGORY | AUTOMOTIVE ▽ |
| ENTER VIN NUMBER | 12345678901234567  [GO] |

ERROR MESSAGE if VIN INCORRECT (flashing)

Make: FORD  Model: PASSPOR  Year: 2001
Doors: 5  EXT Color: BLACK  Trim: LX

Body Type
- ⦿ CP    ○ SU
- ○ SN    ○ WG
- ○ HB    ○ VN

Engine
- ⦿ 8 CYL    ☑ Nat Gas
- ○ 6 CYL    ☐ Elect
- ○ 4 CYL    ☐ NA

Drive
- ☐ 2WD
- ☑ 4WD

☑ Power Steering
☑ Power Brakes

Mats
- ☑ Cloth
- ☑ Vinyl

Seat Type
- ○ Bucket
- ⦿ Captains
- ○ Bench

Seat Material
- ○ Leather
- ⦿ Cloth
- ○ Vinyl

VIN Serial Number: _____
INT Color: _____

Transmission
- ○ 6 SPD    ☐ Auto
- ○ 5 SPD    ☐ 4X4
- ○ 4 SPD

Interior Type
- ☐ Cloth
- ☐ Leather
- ☐ Htd Seats

Radio
- ☐ AM/FM    ☐ INOP    ☐ Missing
- ☐ W/CD    ☑ Stereo    ☐ Tape
- ☐ Brand    ☐ CD Chg    ☐ CD Car
- ☐ Code    ☐ Speakers

Fuel
- ○ Full
- ○ 3/4
- ○ 1/2
- ○ 1/4
- ○ Empty

Odometer Info
- ☐ 6 Digit Odometer
- ☐ Odometer Broken
- ☐ TMV    ☐ NAM
- Mileage: 0

☐ Power Windows    ☐ AC    ☐ Cruise    ☐ TowPkg
☐ Power Seats    ☐ Inop    ☐ TCS    ☐ Run Board
☐ Power Locks    ☐ Warm    ☐ Rear Defog    ☐ Side Steps
                                ☐ ABS    ☐ GrillGuard
☐ Sunroof    ☐ Spoiler    ☐ SRS    ☐ Lug Rack
☐ Moonroof    ☐ Cust Wheel            ☐ Alarm
☐ Targa    ☐ Drv Lights    ☐ Phone    ☐ Keyless Alarm
☐ Conv    ☐ Gold Pkg    ☐ Factory
            ☐ Bra    ☐ Books
            ☐ AirDefl    ☐ Records

*Fig. 4A*

Scenario #2 - Heavy Equipment Description

| SELECT ITEM CATEGORY | HEAVY EQUIPMENT ▽ |
|---|---|

| ENTER SERIAL NUMBER | 123456789012 | GO |
|---|---|---|

ERROR MESSAGE if S/N INCORRECT (flashing)

| MAKE | CATERPILLAR | MODEL | 924G |
|---|---|---|---|

CHECK ALL FEATURES/OPTIONS THAT APPLY

- ☐ 3056 ENGINE
- ☐ CAB, with AIR CONDITIONER
- ☐ DIFFERENTIAL, LIMITED SLIP FRNT
- ☐ LINES, FRONT
- ☐ TIRES, 20.5-R25 XTLA*L2
- ☐ SUN VISOR, FRONT
- ☐ BUCKET, 2.6 CYD (HO)
- ☐ AM/FM CASSETTE RADIO
- ☐ LINKAGE STANDARD
- ☐ SEAT CONTOUR/AIR SUSPENSION
- ☐ DIFFERENTIAL LIMITED SLIP, REAR
- ☐ OIL COOLER, HYDRAULIC
- ☐ GUARD, CRANKCASE
- ☐ SUN SCREEN, REAR
- ☐ COUPLER
- ☐ AIR CONDITIONER

- ☐ FENDERS, STANDARD
- ☐ DOORS, CAB, SLIDING GLASS
- ☐ PRECLEANER, DUST BOWL
- ☐ INSTRUCTIONS, ENGLISH
- ☐ GUARD, POWERTRAIN
- ☐ HEATER, ENGINE COOLANT, 120V
- ☐ CUTTING EDGE, BOLT ON (4 PIECE)
- ☐ EROPS
- ☐ ALTERNATOR, HIGH OUTPUT, 70AMP
- ☐ TRANSMISSION, STANDARD
- ☐ HYDRAULICS, 3 VALVE, 2 LEVER, FNR
- ☐ LIGHTS, AUX, FRONT
- ☐ INSTALLATION GROUP, RADIO 12V
- ☐ COUNTERWEIGHT, EXTRA
- ☐ RIDE CONTROL
- ☐ 3RD VALVE

☐ ADD A FEATURE OR OPTION NOT LISTED ABOVE

Fig. 4B

Scenario #3 - Antique

| Label | Field | | Note |
|---|---|---|---|
| SELECT ITEM CATEGORY | ANTIQUE ▽ | | |
| SELECT PERIOD/STYLE | EARLY AMERICAN ▽ | ✓ | Check box to left and enter new PERIOD/STYLE for antiques |
| SELECT TYPE | TEA SET ▽ | ☐ | Check box to left and enter new TYPE for antiques |
| SELECT PRIMARY COMPONENT | Silver Plate over Pewter ▽ | ☐ | Check box to left and enter new PRIMARY COMPONENT for antiques |
| ENTER MANUFACTURER/ ARTISAN | Paul Revere | | |
| ENTER DATE(s) | c. 1775 | | |

ENTER DESCRIPTORS [ GO ]

*Fig. 4C*

Sample New Item Test Selection Screen list below the desired sensors to analyze for all future items of this type.

| | Sequence | Sensor Test Type |
|---|---|---|
| ☐ | ☐ | Acoustical |
| ☐ | ☐ | Electrical |
| ☐ | ☐ | Electromagnetic fields |
| ☐ | ☐ | Emissions |
| ☐ | ☐ | Engine compression |
| ☐ | ☐ | Fluid levels |
| ☐ | ☐ | Image |
| ☐ | ☐ | Impedance |
| ☐ | ☐ | Infrared |
| ☐ | ☐ | Internal systems self diagnosis |
| ☐ | ☐ | Leaks |
| ☐ | ☐ | Luminance |
| ☐ | ☐ | Magnetic |
| ☐ | ☐ | Mechanical (doors, trunk, hood opening etc.) |
| ☐ | ☐ | Radar |
| ☐ | ☐ | Radiation |
| ☐ | ☐ | Resonance |
| ☐ | ☐ | Smell |
| ☐ | ☐ | Sonar |
| ☐ | ☐ | Surface smoothness |
| ☐ | ☐ | Surface thickness (body, interior, tires, etc.) |
| ☐ | ☐ | Surface type |
| ☐ | ☐ | Tension/reflectiveness (body, roof, etc.) |
| ☐ | ☐ | Thermal |
| ☐ | ☐ | Transparency (windows, windshields) |
| ☐ | ☐ | Vibration |
| ☐ | ☐ | Weight |

Fig. 5

AUTOMATED CONDITION EVALUATOR

CROSS-REFERENCE TO RELATED APPLICATIONS

This application claims the benefit of the filing date of U.S. Provisional Application for Patent entitled "AUTOMATED CONDITION EVALUATOR" and which was filed on Mar. 28, 2003 and assigned Ser. No. 60/458,713.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention is directed towards automated assessment and evaluation of items and, more particularly to automatically creating consistent, objective condition assessment information for items to form a basis for making a decision regarding the item, such as a purchase decision, that is made without having direct access to the item.

With the rapid expansion of the Internet from a quirky computer activity engaged in by computer gurus to a common source of information, entertainment and convenience, we find that our world seems to decrease in size. Activities that once required hopping into a car and driving down the road can now be conducted in your pajamas and your favorite chair.

One of the most popular activities that are conducted using the Internet is on-line shopping. Several Internet based applications have basically created a single world store in which you can shop for any and everything through the window of your computer monitor. For used or pre-owned items, the Internet becomes the world's largest garage sale. However, there are some drawbacks in on-line shopping. One of the main concerns regarding on-line shopping is the lack of ability to adequately inspect the desired item for flaws. Being remote from the product you really can't "kick the tires" in a manner to provide you confidence in the product.

This concern is actually applicable in a variety of other settings as well, including but not limited to mail order, telephone purchases, television or the like. In fact, making any decision regarding an item that is remote from the decision maker can be plagued with this limitation. For instance, an insurance adjuster may want to determine the extent of damage to a vehicle remotely rather than traveling to the accident sight. Is a picture adequate? Sometimes the angle of a picture, the lighting, reflections or the like can easily disguise flaws or make flaws look worse than they actually are.

This concern creates an obvious need in the market. It is desirable to be able to purchase products remotely. When purchasing remotely, the buyer saves the cost as well as the time associated with travel but risks receiving an item that does not exactly match the advertised description and/or condition assessment. Various techniques have been developed that attempt to reduce this risk; however, all of these techniques either fall short of the desired results and/or require human intervention to create or define a description of an item and the condition of the item. Human intervention introduces the potential of human error as well as the subjective judgment of the inspector while increasing the seller's cost in disposing of an item. In the purchasing of high-ticket items such as automobiles, fine art, heavy/construction equipment, etc., the seller's cost and the buyer's risks associated with the remote purchase severely impacts the market for used or pre-owned high-ticket items.

Thus, there is a need in the art for a solution that can significantly reduce the time and cost of creating a consistent, objective condition assessment for items and removes the human element from the inspection of items, such as pre-owned or used items. Such a solution would enable the remote decision makers to make well informed decisions regarding the item. Thus, a person can buy an object on-line with extreme confidence, an insurance adjuster can greatly increase the number of claims he or she can process in a single day, and a museum and expand it's collection without ever leaving the gallery. Such a solution would also have application for in-person buyers by eliminating subjectivity in their own evaluation, thereby increasing their confidence in the condition of their purchases.

BRIEF SUMMARY OF THE INVENTION

The present invention provides a solution to the above-mentioned needs in the art by providing an automated condition evaluator that provides a consistent, objective condition assessment for items and removes the "human factor" from the evaluation. In general, the present invention provides this solution through the use of an item evaluation chamber with an array of sensors that conduct various tests and evaluations of an item that is in a controlled environment.

More specifically, an item to be evaluated is first identified. The process of identifying an object includes subjecting the item to a preparation process. This process includes, among other things, the washing of the exterior and/or interior of the item to remove debris. In addition, any existing documentation regarding the item is entered into the system. For instance, if the item is a motor vehicle, such documentation could include warranties, previous sales orders, Vehicle Identification Number (VIN) maintenance records and accident reports. Other items could include other information including historical information regarding the item, certificates of authenticity, serial numbers etc.

The information regarding the item is then processed and utilized to create, identify and/or extract further information about the product. For instance, the VIN can be evaluated to identify particular information about a vehicle, access national databases regarding the history of the vehicle and obtain manufacturer information regarding the vehicle.

Once the item is identified, either a pre-existing profile that matches the identification of the item is retrieved or a new profile is created. The profile is created using various techniques including, but not limited to, edge detection, lighting sources and shading analysis. In addition, known options or configurations of the item are examined and compared to the actual item being evaluated. This can be accomplished by presenting a checklist to a human operator, querying historical databases based on the serial number of the item, or otherwise.

Data acquisition for the item is conducted to determine the condition of the item. The data acquisition is performed using a variety of different types of sensors and sensor inputs that are all evaluated by a central processor. As the data is being acquired, it is analyzed to identify any data abnormalities, glitches or off-scale data points. If any abnormalities are discovered, the sensors can be reset, repositioned, calibrated or otherwise adjusted prior to resuming or restarting the data acquisition process. In addition, historical records and databases can be interrogated to identify similar items that had similar abnormalities. Such information can be used to optimize sensor selection and adjustment for the detailed data acquisition activity.

Prior to completing the data acquisition phase, an interrogation of other industry sources is performed to define any potential problem areas. In addition, the present invention examines it own data depository for the purpose of identifying any potential problem area trends in similar items. Once any potential problem areas have been identified, the data regarding the item is re-evaluated to determine if it is necessary to acquire additional data from the potential problem areas. If it is necessary to re-acquire, the present invention will focus the proper sensor on the potential problem area and re-acquire detailed information.

Once the sensor inputs, abnormalities and industry-available information have been acquired, the present invention will combine the various sensor inputs, industry trends, historical data, abnormalities, etc., into a condition assessment of the item which can be made available to decision makers. All sensor data will be added to the historical data depository for reference with future similar items.

Advantageously, the present invention provides a consistent, objective, and reliable evaluation regarding the condition of an item. The evaluation can be used in a variety of settings to assist a party that must make a decision regarding the item. In particular, the advantages of the present invention are realized in the context of purchasing used or pre-owned items that are remotely located—such as done for on-line vehicle auctions. However, the various aspects and principles of the present invention are not limited to any such particular application.

The present invention can operate regardless of the type of item being evaluated. Thus, the present invention can be applied to baseballs, baseball bats, exquisite vases, fine paintings, pets, automobiles and just about any other item.

BRIEF DESCRIPTION OF THE SEVERAL VIEWS OF THE DRAWING

FIG. 4A is an exemplary screen shot that can be used for entering such information through the operator console.

FIG. 4B is an exemplary screen shot that could be used for entering preliminary data about an item of heavy machinery.

FIG. 4C is an exemplary screen shot that could be used for entering preliminary data about an antique.

FIG. 5 is a sample screen shot of a screen that allows an operator to select the sensor sequence to be applied during the data acquisition process.

DETAILED DESCRIPTION OF THE INVENTION

The present invention can be implemented as a process that runs within a variety of system environments or as an entire system including various components. In either embodiment, the present invention operates to automatically characterize and evaluate the condition of an item. The characterization and evaluation is accomplished in a manner to eliminate or alleviate any human subjectivity to the evaluation. Thus, a consistent and objective characterization and evaluation of the product can be obtained.

Advantageously, the present invention allows individuals, as well as computing entities, to make decisions regarding an evaluated item based on the results of the evaluation. A typical embodiment for the present invention is for the purchase of items, such as automobiles, from a remote buyer that does not have immediate access to the item and thus, can not "kick the tires" to determine the reliability or quality of the automobile. The present invention can be used in a variety of environments and the particular applications of the invention provided herein are for illustrative purposes only and should not be used to limit the scope or the application of the present invention.

Now turning to the drawings in which like numerals and references refer to like elements throughout the several views, various aspects and embodiments of the present invention are described.

Figure 1:
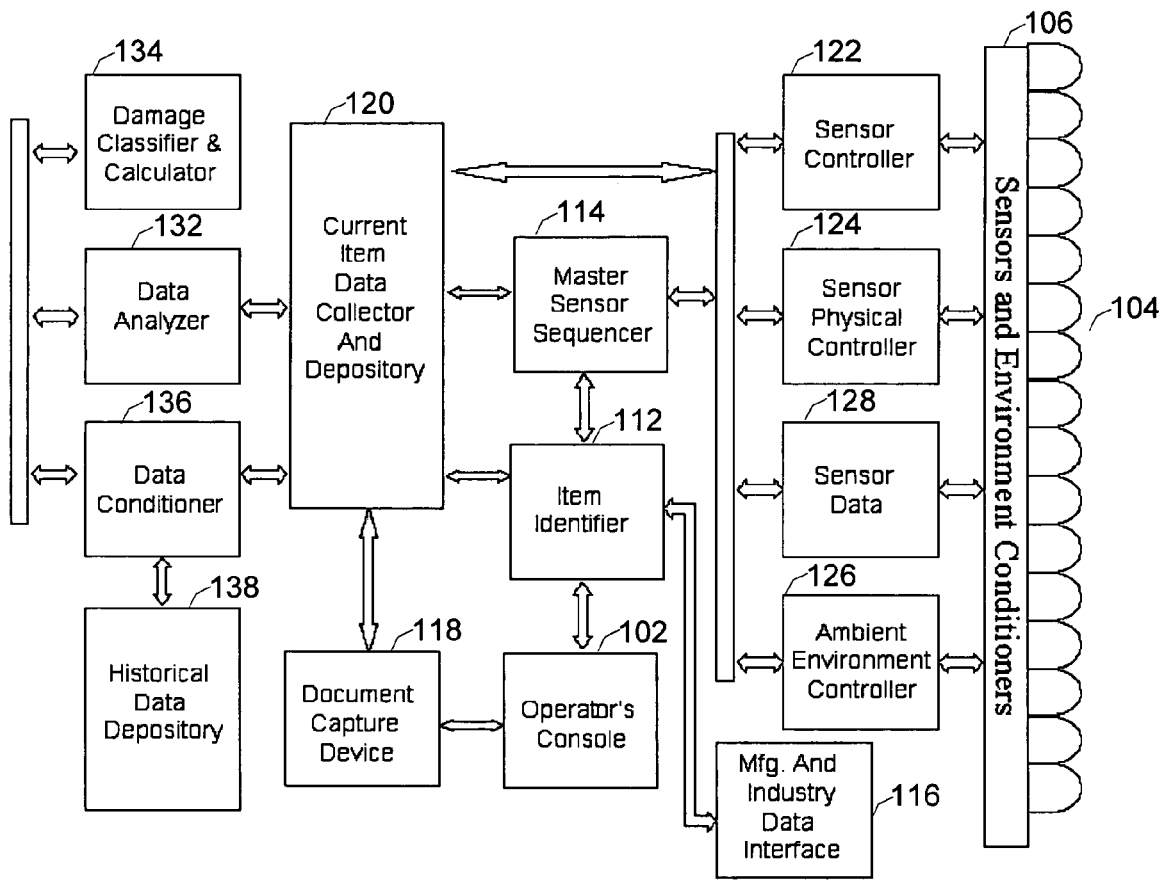
FIG. 1 is a block diagram illustrating the logical functions of an embodiment of the present invention.

FIG. 1 is a block diagram illustrating the logical functions of an embodiment of the present invention. The separation of the functions is generally for the purposes of explanation rather than structure and the various functions may be combined into various processors or subsystems without modifying the scope of the present invention. The illustrated system operates to eliminate the subjectivity of assessing an item's condition as well as to increase the effectiveness and efficiency of accomplishing condition assessment. The system includes seven main elements, subsystems or functions:

(1) Operator Console. The operator console 102 is an optional element of the system that can be used to enhance or provide various additional aspects of the invention but is not required for the core operation of the invention. An exemplary embodiment of the present invention does not require human input or human interaction for operation and thus, the operator console 102 is not a required element for some aspects of the present invention. In embodiments utilizing the operator console 102, the operator console 102 provides the interfaces and capability for an operator to enter information and/or documents regarding and item that is being evaluated—the evaluation item. The operator console 102 also allows the operator to view and/or review data, as it is being captured and classified by the system. If the system requires confirmation regarding a specific test or classification, the operator console can be used to respond to or manage that request.

(2) Item Chamber. Each item to be evaluated by the system is first located into a specialized chamber—the item chamber 104. The item chamber, also referred to as the sensor chamber, can include a variety of sensors 106 and environmental controls 108. The sensors 106 may also include controllable arms, grips and braces that are used to hold the item within in the chamber, adjust the position of the item and adjust the location of the item. The overall effect of the sensors 106 is to allow for a 360 degree analysis, in both the horizontal and vertical direction, of the item. The physical components that stabilize the items will permit movements of varying directions and speeds.

(3) Item Identification. Once the item is installed in the item chamber 104, the item identification process 210 of the present invention can be initiated either automatically upon detection of the presence of the evaluation item, or in response to a command from the operator console 102. The item identification operation of the system will characterize the evaluation item according to physical outline, weight, color, type of material, etc. Once the evaluation item's characteristics have been captured along with any data entered into the operator console 102, the item identification process will interrogate an item identification look up table to identify the type and classification of the evaluation item. The item identification process operates as a cooperative effort of the item identifier 112 that receives input information from the master sensor sequencer 114, the operator console 102 and through the manufacturing and industry data interface 116 and other information entered through the document capture device 118. The item identifier 112 provides its output to the current item data collector and depository 120.

(4) Condition Acquisition. The condition acquisition process 220 actuates the bank of sensors 106 and environmental controls 108 and reads the bank of sensors 106 to extract data. The sensors 106 are used to capture data that allows the item identification process to identify the evaluation item specifications and capture data that allows the condition analyzer to identify the actual condition of the evaluation item. A variety of types of sensors may be utilized by the present invention and the present invention is not limited to any particular sensors, type of sensors for combination of sensors. A few of the sensors that can be incorporated into various embodiments of the present invention include, but are not limited to:

| | |
|---|---|
| Acoustical | Mechanical (doors, trunk, hood opening etc.) |
| Elasticity | Radar |
| Electrical | Radiation |
| Electromagnetic fields | Resonance |
| Emissions | Smell |
| Engine compression | Sonar |
| Fluid levels | Surface smoothness |
| Image | Surface thickness (body, interior, tires, etc.) |
| Impedance | Surface type |
| Infrared | Tension/reflectiveness (body, roof, etc.) |
| Internal systems self diagnosis | Thermal |
| Leaks | Transparency (windows, windshields) |
| Luminance | Vibration |
| Magnetic | Weight |

The condition acquisition process operates by the master sensor sequencer 114 operating the sensors 106 through the sensor controller 122, the physical sensor controller 124 and the ambient environment controller 126 and then reading the data from the sensors 106 through the sensor data block 128. This information is then provided to the current item data collector and depository 120.

(5) Condition Analysis. Following the capture of the condition of the evaluation item through the condition acquisition process, the condition analysis process 250 evaluates and analyzes the data looking for abnormalities. Supplementing the sensor data will also be current ambient condition internal to the item chamber 104. The condition analysis process 250 basically includes the data analyzer 132. The data analyzer 132 receives the sensor input information from the current item data collector and depository and provides an output of the analysis to the damage classifier and calculator 134.

(6) Condition Classification. Subsequent to analyzing the sensor data, the condition classification process analyzes the abnormalities of the evaluation item with all the remaining sensor data for classification. For example, with an automobile, it will classify certain abnormalities as dents, dings or scratches. Abnormalities from any specific sensor will be analyzed in conjunction with the results from the other sensors. The condition classification process includes the damage classifier and calculator 134 which receives inputs from the data analyzer 132, the data conditioner 136 and the historical data depository 138.

(7) Archival. At the completion of the item's evaluation, the archival process will store the collected data as well as any analysis and conclusions drawn from a review of the collected data.

Preferably, the system is implemented with an open architecture design, which allows for the integration of the various elements, functions and subsystems through common interfaces. In such an embodiment, all of the components use standard communications and data protocols to share or obtain information from the other elements.

The present invention can be implemented within a system that includes a distributed or centralized environment. The actual hardware and software used to implement the present invention will be dependent upon several key issues:

(a) The number of items that will be evaluated over a fixed duration (b) The number of unique types of items anticipated to be evaluated (c) The complexity of the items (e.g. automobiles versus baseball bats)

(d) The mission criticality of the evaluation (e.g. is speed an issue)

The operating system and programming language used to implement the present invention can also be chosen to suit the strengths of the actual implementation need. Considerations should be given to the following:

(a) The control of the sensors (speed, accuracy, etc.)

(b) The amount of sensor data being received, processed and stored (the system should not be Input/Output constrained)

(c) The effectiveness for mining data

It is not required that all elements or functions be implemented in the same language or reside on the same system/operating system. Preferably, the programming language, operating system and hardware should support the industry standard interface and communication protocols.

Figure 2:
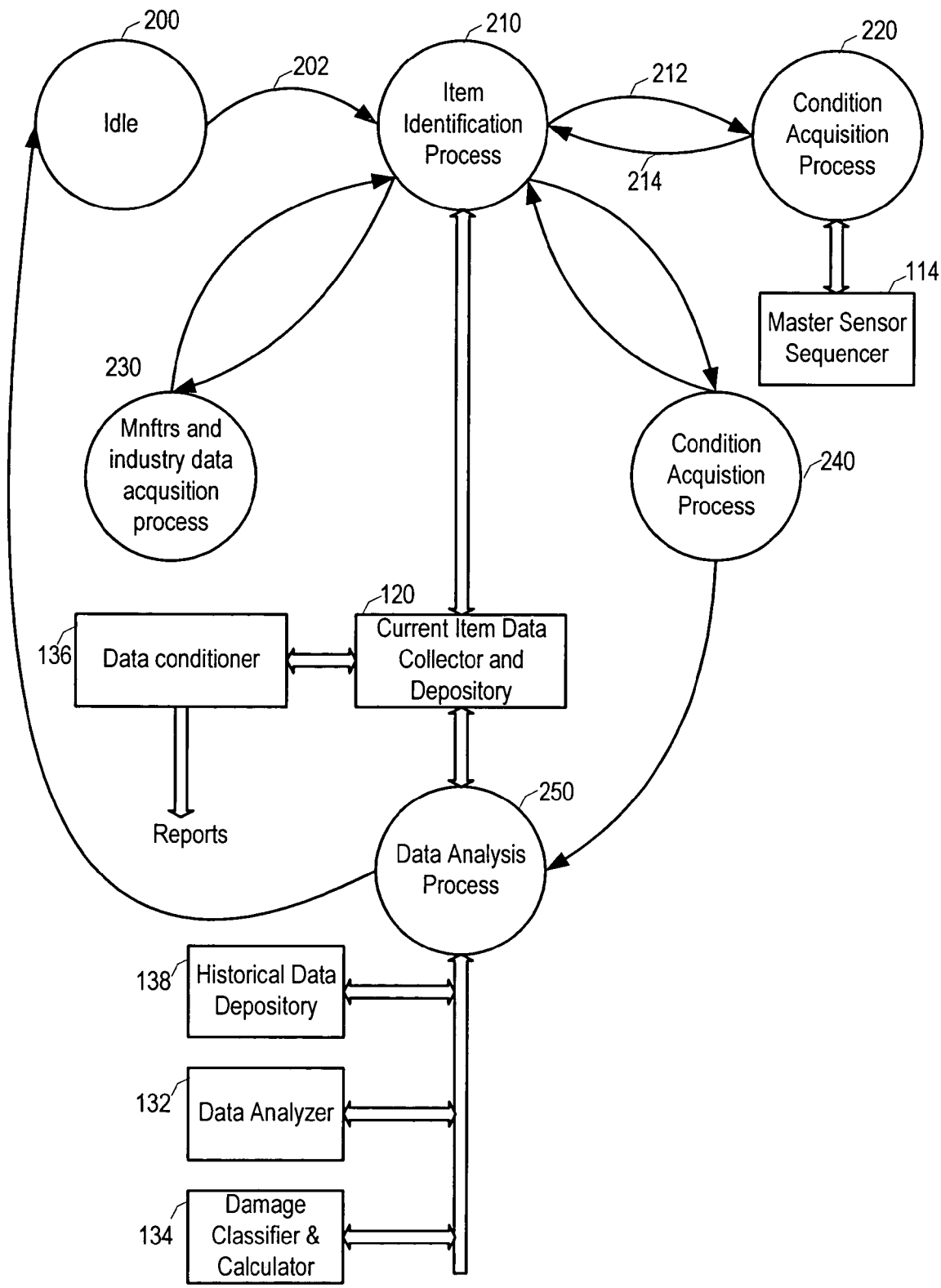
FIG. 2 is a flow diagram illustrating the steps involved in an exemplary embodiment of the present invention.

FIG. 2 is a flow diagram illustrating the steps involved in an exemplary embodiment of the present invention. The flow diagram illustrates several inventive aspects of the present invention and thus, only portions of the entire flow chart may constitute individual inventive elements. However, for illustrative purposes, several of the inventive aspects are combined into a single flow diagram.

The process of conducting an item evaluation begins by providing a notification 202 to the item identification process 210 that one of the following events has occurred:

(a) The ambient environmental controller 126 detects that an evaluation item has been placed into the item chamber 104

(b) The operator console 102 receives an input indicating that an evaluation item has been placed into the item chamber 104 and that the evaluation process should begin In response to the notification, process passes for the idle state 200 to the item identification process 210.

Once notified that the item is in the item chamber 104, the item identification process 210 will trigger the condition acquisition process 220 and provide a sensor sequence to be executed 212. The condition acquisition process notifies the master sensor sequencer 114 to begin execution of an item identification sequence and provides a sensor sequence to the master sensor sequencer 114. If no item identification information is provided through the operator console 102 or through the document capture device 118, the item identification process 210 will provide a general item identification sensor sequence to the condition acquisition process 220 for execution by the master sensor sequencer 114. If item identification information has been provided through the operator console 102 or document capture device 118, the item identification process 210 will generate more specific sensor sequences, which may or may not include the general item identification sensor sequence, to be passed to the master sensor sequencer. The system may include a database of sensor sequences that can be selected from based on the information provided.

In either scenario, the general structure of the sensor sequence may include, but is not limited the following sequences:
- Image analysis
  - Define general outline/volume of item
  - Define color, shading, etc.
- Weight measurement
- Exterior material analysis
  - Image
  - Acoustic
  - Thermal
  - Infrared
- Internal Component Analysis (drawers versus doors, etc.)
  - Image
  - Surface smoothness (gap identification—outline of drawers, doors)
- Key markings (emblems, signature carvings, etc.)
  - Image
  - Surface
  - Alphanumeric After the master sensor sequencer 114 receives the sensor sequence 212 from the condition acquisition process 220, the master sensor sequencer 114 begins to coordinate the following events:

(a) Establish a desired ambient environmental condition within the item chamber 104 that issuitable for evaluating the evaluation item. This is accomplished via the ambient environment controller 126.

(b) Physical place or move the various sensors to optimum or near optimum positions. This is accomplished via the sensor physical controller 124.

(c) Actuate the actual sensors 106 to obtain sensor data. This is accomplished via the sensor controller 122.

As the master sensor sequencer 114 controls the item chamber 104 and activates various sensors 106, resultant data from the various sensor tests will be collected by the sensor data 128. As the test sequence ends, the master sensor sequencer 114 will interrogate and analyze the data stored in the sensor data 128. If the data does not appear to be corrupted, the master sensor sequencer 114 will provide the sensor data 214 to the condition acquisition process 220 which then returns processing over to the item identification process 210.

The item identification process 210 then proceeds to analyze the sensor data received from the master sensor sequencer 114 at the completion of the sensor sequence to either identify the evaluation item or confirm the identify of the evaluation item as entered through the operator console 102 and/or document capture device 118. If the item identification process 210 cannot make a conclusive identification from the results of the sensor sequence, it will use the current data and an identification test look up table to identify a new battery or series of tests for the master sensor sequencer 114 to perform. In this case, the item identification process 210 will again provide a sensor sequence to the master sensor sequencer 114 and await the data results. This process can continue until the evaluation item has been identified, the process is aborted, or an operator intervenes to provide any missing or undetectable data.

After conclusive identification of the evaluation item, the item identification process 210 will store the evaluation item's identification information into the current item data collector and depository 120 and initiate two independent processes.

One process is the manufacturers and industry data acquisition process 230. The manufactures and industry data acquisition process 230 operates to identify expected information about the identified evaluation item. For instance, if specific information about the expected condition, shape or characteristics of the evaluation item is available, the target results process 230 obtains such information. A more specific example is in the automotive industry. The specific information can include a list of options and features available for the automobile, as well as weights and dimensions.

The manufactures and industry data acquisition process 230 will compare the identified evaluation item to a manufacturers and industry identification look-up table to determine if there is a match. If a match is found, the manufactures and industry data acquisition process 230 will promptly interrogate the respective manufacturer's or industry's data depositories to gain specific information regarding the evaluation item or similar items. Information gained from either manufacturer's or industry's data depositories will be collected by the manufactures and industry data acquisition process 230 and sent to the item identification process 210 for storage in the current item data collector and depository.

The other process is another instance of the condition acquisition process 240. This instance of the condition acquisition process is not to identify the evaluation item but rather, to identify further information about the condition of the identified evaluation item. The condition acquisition process 240 will cause the master sensor sequencer 114 to interrogate its item test sequence look up table to identify a suitable sensor sequence or test sequence for the evaluation item. If a test sequence is found that suitably matches the evaluation item's identity, the master sensor sequencer 114 will begin executing the identified test sequence(s). If no match is found, the master sensor sequencer 114 will use a "new item test sequence" and begin executing the test sequences. As the master sensor sequencer 114 controls the execution of a "new item test sequence" it will analyze the resulting data to begin building an item test sequence, which will be stored in the item test sequence look-up table for use with future items that are similar to the evaluation item.

As the master sensor sequencer 114 controls the execution of the sensor tests, it will analyze and prepare the resulting sensor test data for storage in the current item data collector and depository 120.

After the master sensor sequencer 114 stores the complete sensor test results and data in the current item data collector and depository 120, the master sensor sequencer 114 or the condition acquisition process 240 will notify the data analyzer process or the condition analysis 250 of the item identification information, completed test and the location of the resulting sensor data.

The condition analysis process 250 will begin evaluating the completed test data by comparing the sensor test sequence data with the results and comparing it to expected results. The expected results are defined through theoretical predictions to the sensor test as well as analysis of tests results from similar items contained in the historical data depository 138. If the results contain abnormalities, the condition analysis process 250 will notify the damage classifier and calculator 134 of the abnormality and the location of the item's information, including test data.

The damage classifier and calculator 134 will analyze the abnormality, comparing it against previous item trends (both from that item as well as other similar items whose tests results are contained in the historical data depository 138). If no similar items historical data is available, it will use its own library of abnormalities to classify the damage (e.g. dent, ding, scratch, etc.).

Following completion of all the tests, analysis of test data, and classification and calculation of damage information, the complete information will be stored in the current item data collector and depository 120 where a report will be generated and the data conditioner 136 will be notified.

The data conditioner 136 will retrieve all of the information pertaining to the evaluation item current item data collector and depository 120 and prepare it (condense, compact, filter, etc.) for archival storage in the historical data depository 138. Processing then returns to the idle process 200 awaiting the initiation of another evaluation process.

Figure 3:
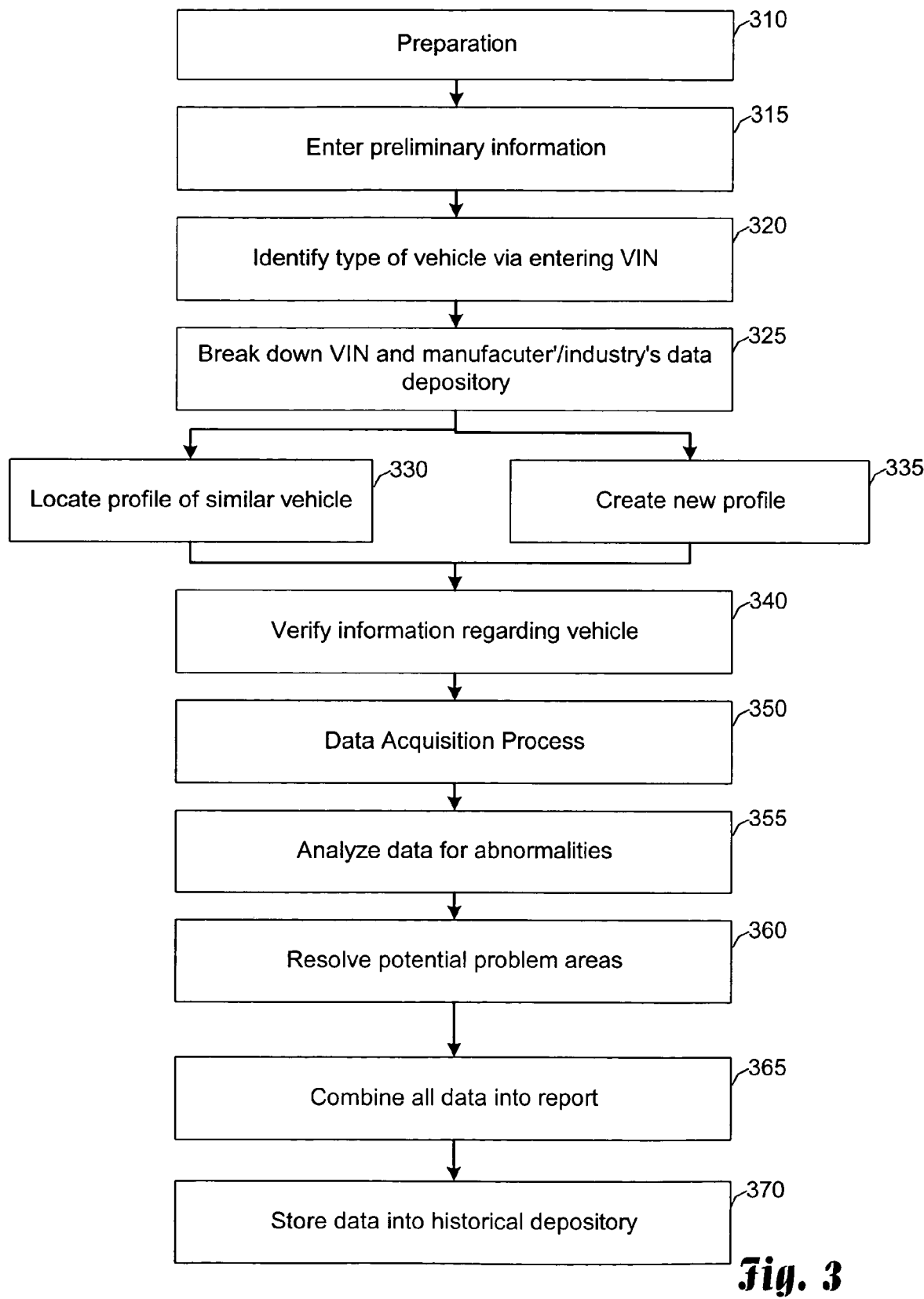
FIG. 3 is a flow diagram illustrating the application of the present invention in the process of evaluating a vehicle.

FIG. 3 is a flow diagram illustrating the application of the present invention in the process of evaluating a vehicle. Initially, the vehicle will undergo a preparation phase 310 which includes tasks such as exterior washing and interior cleaning. Preliminary information about the vehicle will be input into the system 315 either by way of the operator console 102, the document capture device 118, and previously stored data templates or through other techniques. FIG. 4A is an exemplary screen shot that can be used for entering such information through the operator console. FIG. 4B is an exemplary screen shot that could be used for entering preliminary data about an item of heavy machinery. FIG. 4C is an exemplary screen shot that could be used for entering preliminary data about an antique. Preliminary data that could be entered through the document capture device 118 could include items such as warranties, titles, previous sales orders, maintenance records, certificates of authenticity, etc. Such information can be entered via a scanner or an operator can enter data taken from the documents.

A human operator will identify the type of item being evaluated and a manufacturer's serial number (e.g. Vehicle Identification Number—VIN), if available 320. If a manufacturer's serial number is available, the system will begin to break it down (for identification purposes) as well as access the manufacturer's or an industry's data depository to identify the characteristics of the item 325.

A data depository is then interrogated to locate the profile of a similar vehicle previously evaluated 330. A previous profile can be used when identical items (same year, make and model of the vehicle) have previously been evaluated by the system. However, for vehicles with no existing profile (based on the review of previous similar items) the system will create and store a profile for this type of vehicle using various techniques, including but not limited to edge detection, lighting sources and shading analysis, etc. 335.

After the profile has been obtained or loaded, a human operator may be presented with a comprehensive list of features and options available for this type of vehicle. The human operator can be requested to verify and update the list of installed features and options on this specific vehicle to ensure accuracy of the vehicle's analysis 340.

Once the exterior profile of the vehicle and its list of installed features and options have been determined, a data acquisition process for the purposes of determining the condition of the vehicle will begin 350. The data acquisition may involve many different types of sensor inputs and may be based on a sensor sequence provided by an operator, obtained from a database, generated on the fly or entered through the operator console. FIG. 5 is a sample screen shot of a screen that allows an operator to select the sensor sequence to be applied during the data acquisition process. During the data acquisition process by the respective sensor system, the data being acquired will be analyzed to identify any data abnormalities 355. If abnormalities are discovered, the sensors in the sensor suite can be repositioned or adjusted (e.g. sensors, lights, etc.) to continue investigating the abnormality. In addition, historical records will be interrogated to identify similar vehicles with similar abnormalities to optimize the sensor selection and detailed data acquisition activity.

Prior to completing the data acquisition phase, the other industry sources may be interrogated to define any potential problem areas and internal data depository may be interrogated for the purpose of identifying any potential problem area trends in similar vehicles 360. Once any potential problem areas have been identified, the vehicles data will be re-evaluated to assess if it is necessary to acquire additional data for the potential problem areas. If it is necessary to re-acquire, the appropriate sensors will be focused on the potential problem area and re-acquire detailed information.

Once the sensor inputs, abnormalities and industry-available information have been acquired, the various sensor inputs, industry trends, historical data, abnormalities, etc., will all be combined into a condition assessment of the vehicle which can be made available to the buyers 365. Finally, the sensor data will be added to the historical data depository for reference with future similar items 370.

In constructing an exemplary embodiment of the present invention, the first step is the identification and selection of the sensors in the sensor suite 106. Depending on the types of items that will be evaluated, an average systems engineer will be able to quickly eliminate many types of sensors—for example, if the system is going to evaluate sporting goods such as baseballs and baseball bats, the configuration will not require elements such as emissions sensor among others. The sample sensor suite identified is comprised of off-the-shelf sensor systems that include the controls, tools, techniques and software required to obtain and interpret the resulting raw data. For sensor systems that do not include the controls, tools, techniques and software, existing algorithms (e.g. edge detection, lighting/shading, etc.) are available from third party applications that provide a developer of average skill, the capability to integrate and interpret the raw sensor data.

The second step in constructing an exemplary embodiment of the present invention is the storage of the interpreted sensor data into a common database. It is not required that the various sensor data be stored or saved integrated with the other sensor data. The data base schema for each sensor will be defined by the sensor and its controls, tools, techniques and application software and can be easily implemented by a database administrator of average skill.

The last step in constructing an exemplary embodiment of the present invention is the evaluation of the sensor data. This will be accomplished using standard data mining techniques that compare existing data to historical data looking for repeatable trends. The data mining portion of the exemplary embodiment of the present invention can be implemented by a data mining data base administrator of average skill.

Among other things, the present invention is novel based on the integration of the various off-the-shelf and standard industry available elements and the process described herein.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A system for evaluating the condition of an item, the system comprising the components of:

a sensor chamber including an interior area for housing an evaluation item, the interior area including a plurality of sensors;

a controller that is communicatively coupled to the plurality of sensors and operative to control the operation of the plurality of sensors and obtain data readings from the plurality of sensors, wherein the controller is operable to detect when the evaluation item is placed into the interior of the sensor chamber;

an information acquisition engine operable to receive information regarding the evaluation item;

a database containing expected results pertaining to the evaluation item; and a damage calculator that is operable to compare the data readings from the plurality of sensors and the expected results from the database to identify particular characteristics pertaining to the evaluation item.

* * * * *